Nov. 30, 1926.
R. M. ANDERSON
RULER
Filed July 6, 1925
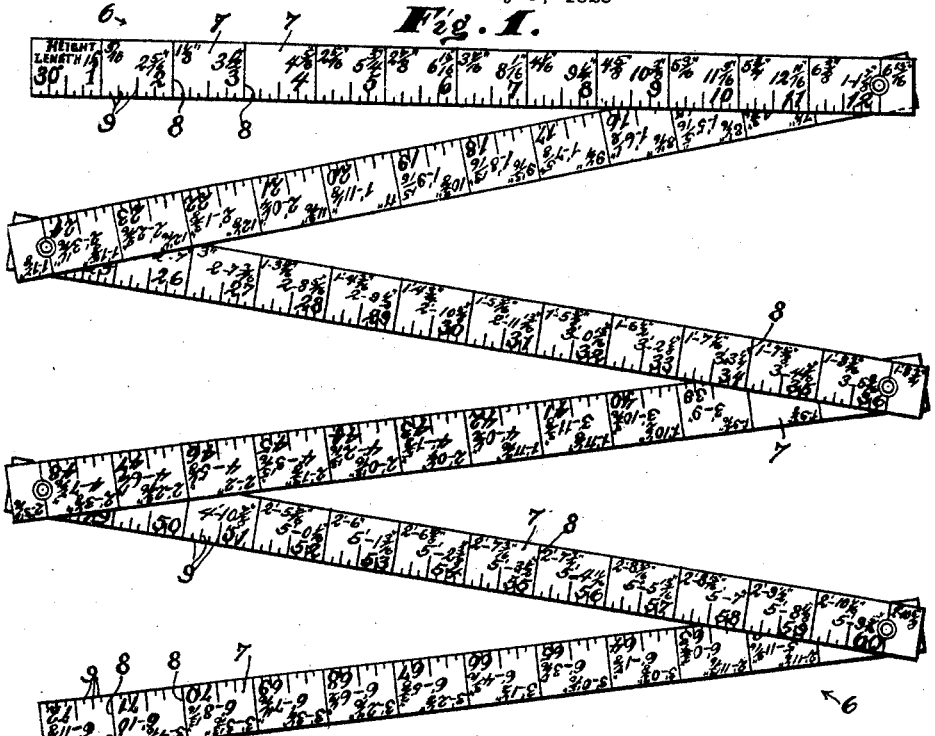
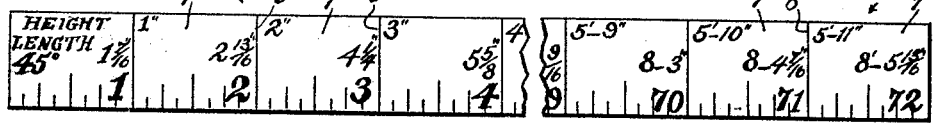
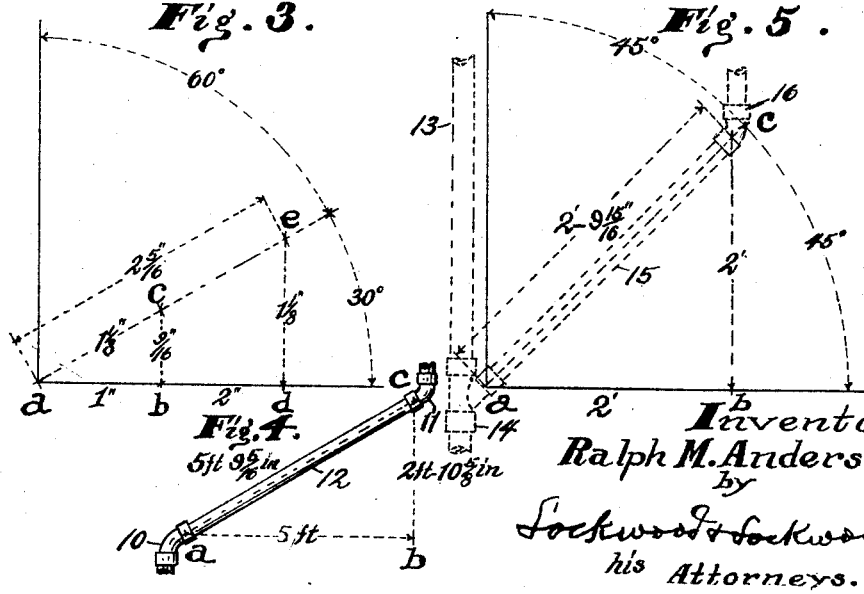
Inventor.
Ralph M. Anderson.
by
Lockwood & Lockwood
his Attorneys.

Patented Nov. 30, 1926.

1,608,713

UNITED STATES PATENT OFFICE.

RALPH M. ANDERSON, OF LOS ANGELES, CALIFORNIA.

RULER.

Application filed July 6, 1925. Serial No. 41,832.

An object of this invention is to provide a ruler that is especially adapted to the use of pipe fitters and plumbers to enable them to instantly and accurately know the longitudinal dimension of the hypotenuse and perpendicular side of thirty and forty-five degree triangles with known bases.

That is the ruler has a scale arranged on one side thereof that indicates the exact length of the hypotenuse and also the perpendicular side of a forty five degree angle with a base length of one inch and multiple thereof; and the other side is provided with a scale that indicates the exact length of the hypotenuse and perpendicular side of a thirty degree angle with a base length of one inch and multiples thereof so that an unskilled artisan when knowing the base of either of the triangles can instantly know the measurements of the other sides.

Heretofore it has been necessary for pipe fitters and plumbers when running pipe lines of either 30 or 45 degree angles to determine the length of pipe by the slow tedious method of mathematical calculations which ofttimes have not been accurately calculated with the results that both time and labor have been lost; and also that the pipes were cut too long or short to be fitted into the desired place. An object of this invention is to save time and labor.

An object of the invention is to provide a ruler that will enable unskilled laborers who have not the ability to make mathematical calculations to use it for the purpose hereinbefore specified. To that end I preferably take an ordinary folding ruler for linear measurement and let the usual numerals thereon give the length of the base lines of the triangle, and provide cross lines between the units of measurement to represent the altitudes of the triangles with numerals near them which give their heights. Somewhere on the ruler, preferably at the zero end, I give the pitch angle of the triangles for which the ruler is adapted, and near and preceding each altitude line I give the hypotenuse of the triangle having the indicated base and altitude, so that the measurements of all three sides of each triangle are located near each other.

While the scales herein employed are especially adapted to a six foot folding ruler for use of pipe fitters and plumbers it is understood that they can be of any length; and be arranged on tape lines, squares or surveyor chains as well; and if desired the length of folding rules can be six inches instead of twelve.

Other objects, advantages and features of invention may appear from the accompanying drawing, the subjoined detailed description and the appended claim.

The accompanying drawing illustrates the invention.

Fig. 1 is a side view of a ruler constructed in accordance with this invention showing the side on which the data relating to 30 degree triangles is fixed; and which is used on pipe connections commonly called 60 degree fittings.

Fig. 2 is an enlarged fragmental portion of the rule showing it about actual size and also showing the data relating to 45 degree triangles.

Fig. 3 is a diagrammatic view of a 30 degree triangle having a base length of one inch and multiple thereof showing the length and height of the other sides.

Fig. 4 is a fragmental view of a pipe line with one length thereof fitted across the hypotenuse side of a 30 degree triangle to additionally illustrate how the ruler is employed to determine the length of the hypotenuse side of the angle.

Fig. 5 is a diagrammatic view of a 45 degree triangle showing a pipe line therein and illustrating how the ruler is used to determine the length of pipe that will fit across the hypotenuse side of the triangle.

The folding ruler 6 has the sides 7 thereof provided with cross or altitude lines 8 that separate the ruler into inch lengths, sections or spaces, that are numbered from 1 to 72 inclusive as in ordinary linear measurement; with the usual shorter lines 9 that divide the inch spaces into fractions of an inch as is common in an ordinary ruler; and preferably the numerals of the inch scale are arranged adjacent the bottom edges of the ruler.

The data that indicates the character of the ruler is arranged in the first inch space to the left end and on both sides thereof.

The word "Height" is arranged in the first inch space adjacent the upper edge and it indicates that the data to the right of it and in alignment thereof and on the right side of the respective cross lines are the exact measurements of the perpendicular sides of right angle triangles having a one inch base length and multiple thereof. This word "Height" is used to designate the perpendicular sides of right angle triangles as it is thus used in the plumbing and pipe-fitting art.

The word "Length" is arranged below the word "Height" and it indicates the exact lengths of hypotenuses having base lines of one inch and multiples thereof and the data relative to these lengths are arranged to the right of the word "Length" and to the left of their respective cross lines. And below the word "Length" is arranged the degree of the right angle triangle preferably 30 degrees on one side and 45 degrees on the other as these are the angles that are most used in laying angular pipe lines and arranging 45 and 60 degree pipe-fittings.

Near each altitude line 8, and preferably at the right hand side thereof the height of such altitude line is given and nearer said line, preferably immediately to the left thereof, the length of the hypotenuse is given, and also near such altitude line the length of the base is given. Therefore these three measurements being the lengths of all the sides of the triangle, are located near the altitude line of the triangle and close together so that they can all be seen at a glance. Also the row of numerals indicating the heights of the altitude lines on the ruler are opposite the word "Height" at the zero end of the ruler, and all the numerals indicating the lengths of the hypotenuses of the triangles are in a row opposite the word "Length" at the zero end of the ruler, as appears fully in Fig. 2. This renders the ruler easily readable. In other words the ordinary folding ruler with the ordinary numerals indicating the linear measurement is divided by the altitude lines 8, as it were, into sections, and all of the ruler to the left of each altitude line may be considered a rectangle, the base line measuring the base of the triangle correctly and the altitude line 8 representing the altitude of a right angle triangle constituting one-half of such rectangle. The altitude line does not extend the full length indicated by the numeral, but can be imagined as extended, and the hypotenuse line can also be imagined as running from the lower left hand corner of the zero end of the ruler to the upper right hand corner, or to the upper end of the altitude line; so that in a sense the ruler fully visualizes the base of the triangle and partially visualizes the altitude line and enables the mind to imagine the location of the hypotenuse line, and the numerals giving the lengths of all three of said lines are located together adjacent the altitude line. This makes such ruler very readable and leaves nothing to calculate.

In Figs. 3, 4 and 5 the use of the ruler is illustrated.

In Fig. 3 a 30 degree right angle triangle is shown having a base length $a-b$ of one inch in length. Assuming that the dimensions of the other sides of the triangle are unknown and that an unskilled artisan desires to obtain them. By referring to his ruler and noting the height and length dimensions of 30 degree right angle triangles he readily sees that the dimensions of the other sides $a-c$ and $b-c$ of the triangle are respectively $1\frac{1}{8}$ inches and $\frac{9}{16}$ of an inch.

If the base line $a-b$ was extended to $d$ so that it would be two inches in length, the sides $a-e$ and $d-e$ would respectively be indicated by the ruler as $2\frac{5}{16}$ inches and $1\frac{1}{8}$ inches.

In Fig. 4 the use of the ruler in obtaining the length of the unknown sides of 30 degree right angle triangles is additionally illustrated. As seen therein a 60-degree elbow 10 is arranged at the point $a$ and another 60 degree elbow 11 at the point $c$, a known distance of 2 feet $10\frac{5}{8}$ inches above the point $b$ that is also a known distance of 5 feet from the point $a$; and the unskilled artisan is required to cut a pipe 12 to fit between the elbows, the length of which is unknown. By referring to his ruler he readily sees that a pipe 5 feet $9\frac{5}{16}$ inches is required.

In Fig. 5 the use of the ruler in fitting pipe on 45 degree angles is illustrated. As seen therein the pipe line 13 has a Y-pipe 14 that is arranged to be connected by an inclined pipe 15 to an elbow 16.

The elbow 16 is arranged the distance of 2 feet above the point $b$; and $b$ is the distance of 2 feet from the point $a$.

With the length of the sides $a-b$ and $b-c$ of the right angle triangle $a-b-c$ known, the artisan is required to cut a pipe that will extend the unknown distance from $a$ to $c$. By referring to the side of the ruler giving 45 degree triangular measurements he readily finds at the 2 foot marking that the hypotenuse of the triangle is 2 feet $9\frac{5}{16}$ inches, the length of pipe that is required.

The invention claimed is:

A ruler for indicating hypotenuses of right angle triangles, consisting of an elongated linear ruler divided by transverse lines into rectangular sections having successively increasing length from a common zero point, said lengths corresponding to those of the base lines of the triangles, and the transverse lines across the ruler at the end of each section being provided with a numeral near it giving the altitude of the corresponding triangle, with another numeral giving the base of the triangle, and with a numeral giving the length of the hypotenuse of the triangle, said ruler having a numeral thereon giving the pitch angle of said triangles.

In witness whereof, I have hereunto affixed my signature.

RALPH M. ANDERSON.